May 9, 1939.  H. G. YETTER  2,157,253

TRACTOR WHEEL SCRAPER

Filed Feb. 25, 1938  2 Sheets-Sheet 1

H. G. Yetter
INVENTOR.

BY C. A. Snowles.
ATTORNEYS.

May 9, 1939.  H. G. YETTER  2,157,253

TRACTOR WHEEL SCRAPER

Filed Feb. 25, 1938  2 Sheets-Sheet 2

H. G. Yetter
INVENTOR.

BY CA Snow & Co.
ATTORNEYS.

Patented May 9, 1939

2,157,253

UNITED STATES PATENT OFFICE 2,157,253

TRACTOR WHEEL SCRAPER

Harry Gaylord Yetter, Colchester, Ill.

Application February 25, 1938, Serial No. 192,661

1 Claim. (Cl. 280—158)

This invention relates to a wheel scraper attachment for tractors used in cultivating row crops, the primary object of the invention being to provide an attachment of this character which will scrape and remove the mud and trash from the front wheels of tractors, thereby eliminating any possibility of the front wheels of the tractors locking due to the collection of mud and trash between the upright wheel supporting spindles and front wheels of the tractors.

An important object of the invention is to provide a scraper especially designed for positioning between the front wheels of the usual tractor employed in cultivating row crops, wherein the front wheels are arranged exceptionally close to each other.

Another object of the invention is the provision of means for permitting adjustment of the scrapers, to the end that the scrapers may be properly positioned to adapt the scraper for use in connection with wheels and tires of various sizes.

A still further object of the invention is to provide a scraper curved in such a way that the trash and mud will be thrown laterally away from the treads of the wheels.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings.

Figure 1:
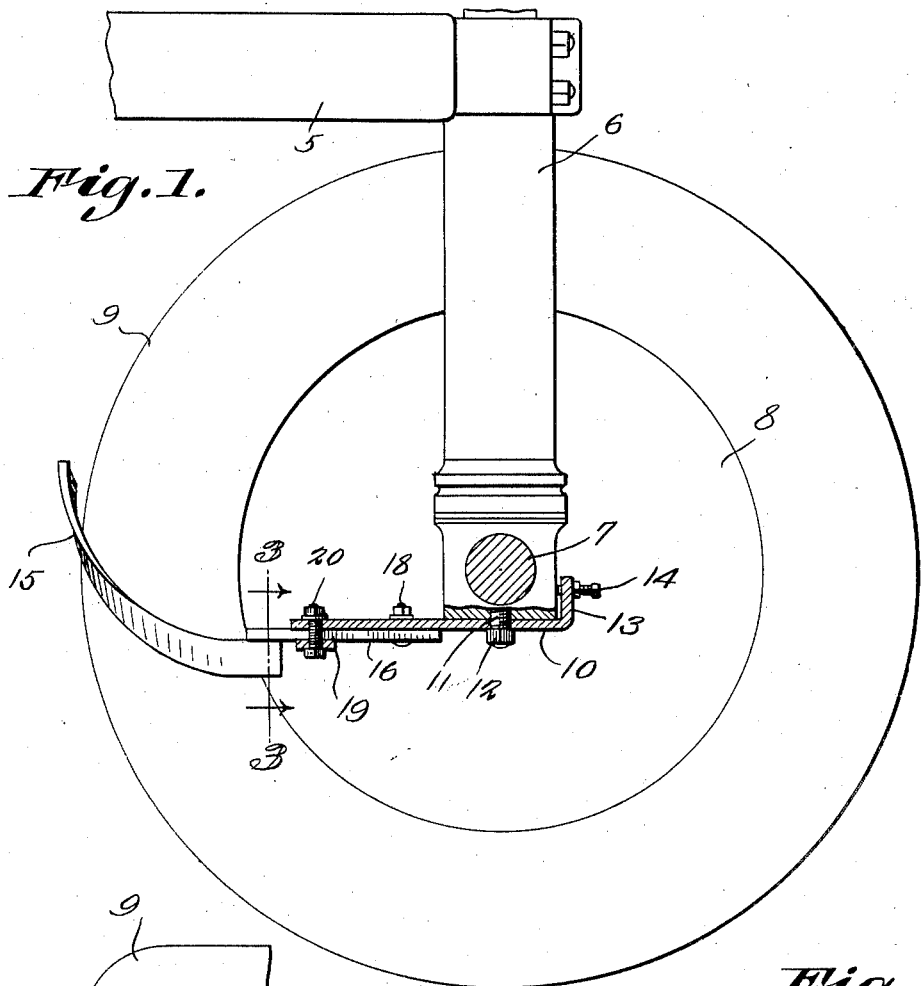
Figure 1 is an elevational view of a tractor wheel supplied with an attachment constructed in accordance with the invention, the wheel, axle and bracket of the attachment being shown in section.
Figure 2:
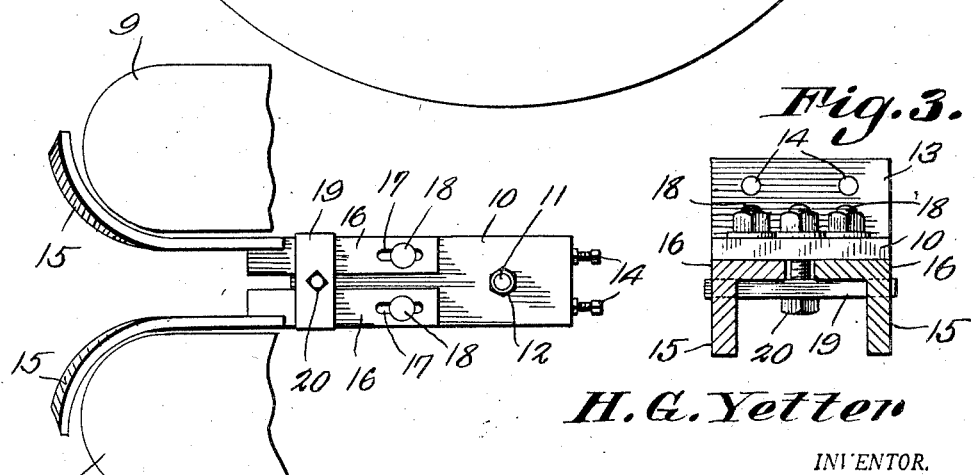
Figure 2 is a bottom plan view of the attachment.
Figure 3:
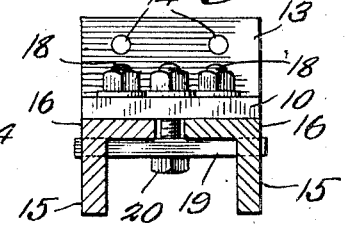
Figure 3 is a sectional view taken on line 3—3 of Figure 1.
Figure 4:
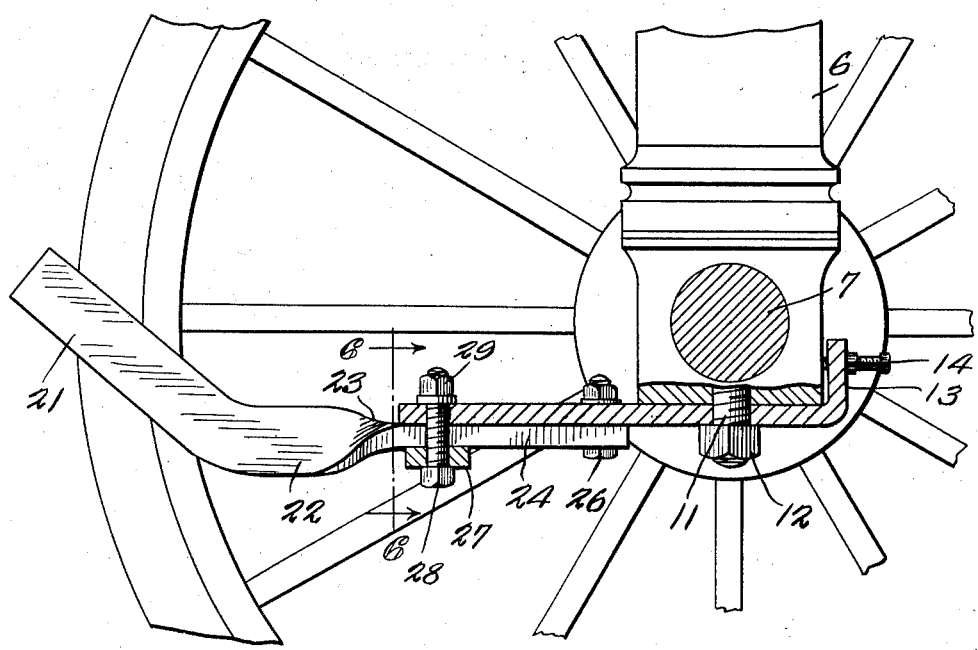
Figure 4 is an elevational view of a modified form of scraper designed primarily for use in connection with metallic tractor wheels, the attachment bracket and axle being shown in section.
Figure 5:
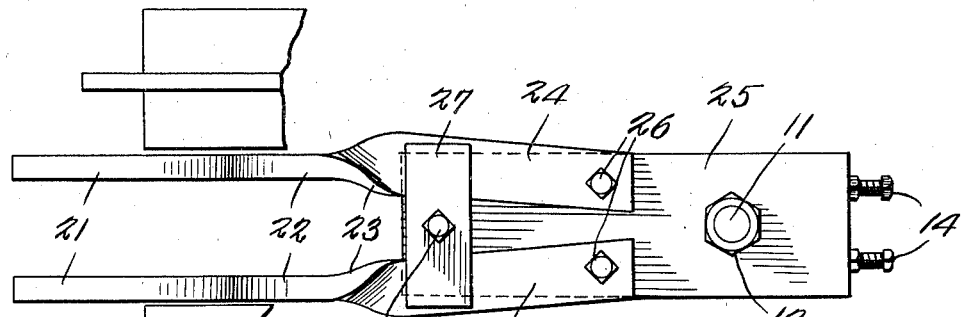
Figure 5 is a bottom plan view of the attachment.
Figure 6:
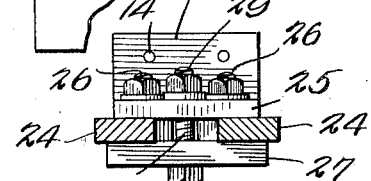
Figure 6 is a sectional view taken on line 6—6 of Figure 4.

Referring to the drawings in detail, the reference character 5 designates the front end of a tractor frame to which the upright spindle 6 is connected, the spindle 6 providing a support for the axle 7, on which the wheels 8 are mounted.

As shown by Figure 1 of the drawings, the wheels with which the scraper is used, are provided with pneumatic tires 9, the scraper shown by Figure 1 of the drawings being of a design to adapt it for use in connection with pneumatic tires.

The reference character 10 designates the scraper bracket, which is in the form of a plate provided with an opening through which the bolt 11 passes, the bolt being secured to the lower end of the spindle 6, and supplied with a nut 12 adapted to engage the bracket 10, securing the bracket to the lower end of the spindle.

The inner end of the bracket 10 extends upwardly at 13 where it is provided with openings to receive the set screws 14, the set screws engaging the spindle, to further secure the bracket 10 against movement.

The reference character 15 designates the scraper blades which are gradually curved upwardly and outwardly, as clearly shown by the drawings, to the end that the curvature of the blades will conform to the curvature of the sides and tread portions of the pneumatic tires, with which the scrapers are used. These scraper blades are secured to the plates 16, which plates are formed with elongated openings 17 to accommodate the adjusting bolts 18 that pass through openings in the bracket 10, whereby the plates 16 and blades 15 supported thereby, may be adjusted longitudinally of the bracket 10, so that the scraping portions of the blades, may be arranged in proper spaced relation with the side walls and tread of the tires, to insure the scraping of the mud and foreign matter therefrom.

Disposed adjacent to the outer end of the bracket 10, is a transverse plate 19 that contacts with the lower surfaces of the plates 16, clamping the plates 16 into close engagement with the lower surface of the bracket 10. A bolt indicated by the reference character 20 secures the transverse plates 19 in position on the bracket 10, and by tightening the bolt 20, the plates 16 may be securely held in position. By loosening the bolt 20, as well the bolts 18, the scraping blades 15 are capable of lateral adjustment insuring the proper operation of the scraping blades.

In the form of the invention as shown by Sheet 2 of the drawings, the scrapers are designed primarily for use in connection with metallic tractor wheels, wherein the felloe and tread portions thereof are of metallic formation.

The blades of the scrapers in this type of the invention, are indicated by the reference character 21, and extend upwardly at oblique angles with respect to the main portions 22 thereof, the main portions 22 being twisted, at 23, presenting substantially straight portions 24 that are bolted to the bracket 25, by means of the bolts 26, that pass through registering openings in the portions 24 of the blades, and bracket 25. Since these bolts 26 are secured adjacent to the inner ends of the blades, it will be seen that the blades may be readily adjusted laterally to the end that they may be properly positioned with respect to the side edges of the wheels with which they are used, to better adapt them for use in scraping various types of foreign matter from the wheels.

The reference character 27 designates a transverse plate of a length to engage the portions 24 of adjacent scraping blades, the plate 17 being secured to the bracket 25, by means of the bolt 26 that is supplied with a nut 27, which may be operated to hold the plate 27 into close engagement with the portions 24 of the scraping blades. This plate 27 not only assists in supporting the weight of the scraping blades, but at the same time affords means for holding the scraping blades in their positions of adjustment.

From the foregoing it will be seen that due to the construction shown by Sheet 1 of the drawings, the scraping blades which are curved to conform to the curvature of the side wall and tread of a pneumatic tire, will act to scrape mud and trash from the tire, the pitch of the blade being such as to throw the material scraped from the tire away from the wheel.

In the form of the invention as shown by Sheet 2 of the drawings, the scraping blades 21 act to remove the foreign matter which clings to the sides of the treads of the wheels with which the scrapers are used.

In this form of the invention, the bracket 25 is of the same construction of the bracket 10 previously dedscribed.

I claim:

A scraper for tractor wheels, comprising a wide bracket member, scraping blades secured to the wide bracket member, each scraping blade including a curved blade section and a supporting section, each of said supporting sections of the blades having an elongated opening near the free and thereof, bolts extending through the elongated openings and bracket member adjustably securing the scraping blades to the bracket member, a transverse plate bolted to the bracket member and engaging the supporting sections of the blades, securing the blades on the supporting bracket, and said blade sections adapted to operate adjacent to the tractor wheels for removing foreign matter therefrom.

HARRY GAYLORD YETTER.